United States Patent
Leonard

[11] 3,903,782
[45] Sept. 9, 1975

[54] PRIMARY CHORD ORGANIZER

[76] Inventor: Verna M. Leonard, 8701 Highway 41, Fresno, Calif. 93710

[22] Filed: July 24, 1974

[21] Appl. No.: 491,252

[52] U.S. Cl. .................. 84/471; 84/474; 84/485
[51] Int. Cl.² ........................................ G09B 15/00
[58] Field of Search........ 84/470, 47 X, 477 R, 483, 84/485

[56] References Cited
UNITED STATES PATENTS

| | | | |
|---|---|---|---|
| 359,829 | 3/1887 | Withers | 84/474 |
| 1,804,460 | 5/1931 | Cordier | 84/474 |
| 2,542,235 | 2/1951 | Clopton | 84/474 |
| 3,472,117 | 10/1969 | Iverson et al. | 84/474 |
| 3,621,750 | 11/1971 | Leonard | 84/471 |

Primary Examiner—Stephen J. Tomsky
Assistant Examiner—John F. Gonzales
Attorney, Agent, or Firm—Ralph S. Branscomb

[57] ABSTRACT

An aid for teaching the relationships between the tonic, or root chord, and the related major and minor chords for every key signature of the musical scale. The device also illustrates that these relationships are unchanging from one key signature to the next when viewed from the perspective of the cycle of fourths. This is taught graphically be a rotatable disc having displayed in consecutive sections the scale tones arranged according to the cycle of fourths, the scale tones selectively and individually registering with fixed background indicia having the key signature and related major and minor chords in that key signature.

A plurality of selectively exposable strips having blank staffs thereon is provided for the inscription of the notes of the chords by the student, and a series of selectively exposable panels representing piano keyboards is also provided, with blank spaces to be filled with the scale tone names identified with the piano keys.

3 Claims, 2 Drawing Figures

PRIMARY CHORD ORGANIZER

BACKGROUND OF THE INVENTION

It is the constant goal of the music teacher to impart some organization to the deceptively simple seeming musical scale so that the student will have some framework with which to approach the complexities of music theory. There is an especial need to demonstrate to the student that the various major and minor chords which "sound good" in a particular key signature, as opposed to certain chords which sound alien to the key, are not arbitraily selected but are tightly structured around the key and moreover this structure can be superimposed unchanged on every key signature to indicate the related major and minor chords.

SUMMARY OF THE INVENTION

The invention comprises a disc which displays in consecutive sectors the names of the twelve scale tones of the musical scale organized according to the cycle of fourths. The scale tone names can be considered as chord symbols or key signatures as well as scale tones. The disc is rotatably mounted on a backing sheet which has displayed thereon adjacent the disc indicia selecting a key signature from the symbols on the disc, and indicia selecting the several primary major and minor chords related to the key signature selected.

Mounted on the backing sheet below the disc is a group of selectively exposable strips having blank musical staffs displayed thereon so that the user of the device can first rotate the dial to select a key signature, and then inscribe the notes of the major and minor chords indicated on the dial on the exposed strip. A new strip is then exposed, and the dial rotated to select a new key signature, and the process is repeated.

A plurality of selectively exposable keyboard representation panels is displayed beneath the staff strips. Each of the panels has a blank space associated with each key which are filled in with the scale tone names of the piano keys as the student fills in the strips, so that the keyboard structure, scale tone names, and note reading are learned simultaneously with the major and minor chord structure.

DETAILED DESCRIPTION OF THE PREFERRED EMBODIMENT

Figure 1:
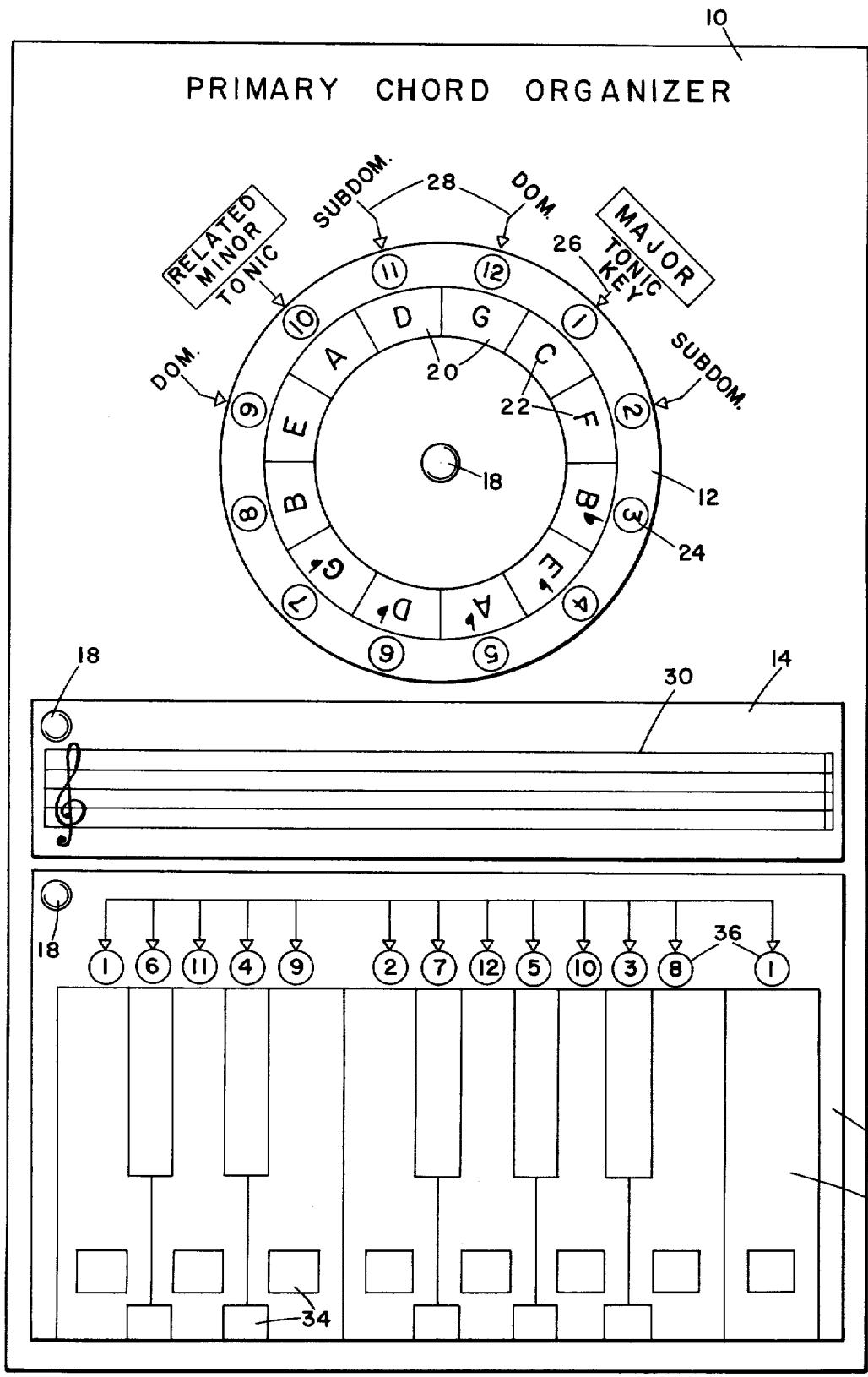
FIG. 1 is a front elevational view of the device.
Figure 2:
FIG. 2 is a side elevation taken from the right side of FIG. 1.

The Primary Chord Organizing Aid comprises a backing sheet 10 to which are mounted a rotatable disc 12, selectively exposable strips 14, and selectively exposable panels 16, all mountings being preferably pivotally made with rivets 18. All the elements except the rivets can be made of paper, with the backing sheet 10 being stiff enough to sustain the weight of the elements mounted to it when upright, for example when supported in the music rack of a piano. The relative positions of the elements are as shown, and it should be noted that the strips 14 and the panels 16 may be provided in pad or tablet form rather than being pivoted, the important feature being that the upper strips or panels must be shiftable or removable to expose succeeding strips or panels.

The disc is divided into twelve angularly contiguous sectors 20, and in these sectors are named the scale tones 22 of the musical scale in clockwise order according to the cycle of fourths. Each of the named scale tones 22 may also be numerically identified as at 24 according to its position in the cycle of fourths relative to C which is the beginning tone and assigned the numeral 1, the purpose of which will be discussed thereafter.

At this point it should be understood that although the cycle of fourths is developed from scale tones, and the symbols 22 are identified as such to avoid confusion, it is also of musical significance to consider the symbols as representing chord names or key signatures. Thus the scale tone symbol C may be understood to indicate the major C chord, or the key of C rather than the scale tone of C.

On the backing sheet 10 adjacent the periphery of the dial is a legend 26 comprising the word "KEY" and an arrow indicating that the particular one of the scale tone symbols 22 registering with the arrow, which is C in the drawings, is to be taken as the key signature. Other indicia 28 juxtapose with others of the scale tones to indicate the relative minor chords (dominant, tonic, and subdominant), and relative major chords (dominant, tonic, and subdominant) in the indicated key signature.

It is apparent that by rotative adjustment of the disc 12, any key signature can be selected and the related major and minor chords will be indicated by the indicia 28.

Once the key signature has been selected, the notes of one or more of the chords indicated can be written on the staff 30 on the exposed one of the strips 14 so that the student can relate the chords as they appear as written notes to key signature. The strips may be discarded after use or retained for future reference, and may be provided with a bass clef or, as shown, a treble clef.

The panels 16 beneath the strips 14 each depict a piano keyboard 32, and each key of the keyboard is provided with a blank writing space 34. These spaces are to be filled in with the names of the scale tones of the chords which appear in note form on the staff 30, and as with the strips 14 the panels may be discarded after use or retained, as desired.

Also appearing on the panels 16 are a series of numbers 36, one for each individual key and numbering that key in accordance with the cycle of fourths, comparable to the numbering 24 on the disc 12. This numbering emphasizes to the student the relationship between the physical arrangement of the piano keys, which represents a chromatic scale, and the cycle of fourths arrangement, making it clear that more than one scheme for ordering the scale tones on the musical scale is possible.

After having used the teaching aid, the student should be familiar with the structure of the primary major and minor chords in any key signature and the unchanging nature of that structure from one key to the next. In addition, the appearance of the various chords as notes on a staff, and on the keyboard, should be apparent, so that the student will be well versed in all aspects of major and minor chord relationships.

I claim:

1. A primary chord organizing aid comprising:
   a. a substantially rigid backing sheet;

b. a disc mounted for rotational adjustment on an upper portion of said backing sheet and having twelve consecutive sectors, the names of the scale tones of the musical cycle of fourths being individually displayed in order in successive one of said sectors, said scale tone names being numbered in the order of the cycle of fourths;

c. indicia on said backing sheet adjacent said disc and registerable with any selected one of said sectors to identify the scale tone named thereon as the key;

d. further indicia on said backing sheet adjacent said disc and identifying by juxtaposition with the sectors of said disc the related major and minor chords in said key; and e. at least one panel mounted on a lower portion of said backing sheet, and displaying a keyboard with the individual keys numbered corresponding to numbering of the scale tones named on said dial.

2. Structure according to claim 1 wherein said at least one panel comprises a plurality of selectively exposable panels, the representations of the individual keys of each panel being provided with a blank space for the inscription of the scale tone name of the particular key.

3. Structure according to claim 2 and including a plurality of selectively exposable strips mounted to said backing sheet, each of said sheets having thereon a display of a blank musical staff, whereby the user of the aid can inscribe thereon the notes of the major and minor chords selected on said disc.

* * * * *